United States Patent [19]

Zinke

[11] Patent Number: 5,661,784
[45] Date of Patent: Aug. 26, 1997

[54] METHOD FOR OPERATING AN AUTOMATIC ORDERING SYSTEM IN COMMUNICATION SWITCHING EXCHANGES

[75] Inventor: Joachim Zinke, Niddatal, Germany

[73] Assignee: Telenorma GmbH, Frankfurt am Main, Germany

[21] Appl. No.: 376,954

[22] Filed: Jan. 20, 1995

[30] Foreign Application Priority Data

Jan. 20, 1994 [DE] Germany ................ 44 01 518.6

[51] Int. Cl.$^6$ .................................... H04M 3/42
[52] U.S. Cl. ..................... 379/89; 379/201; 379/243
[58] Field of Search ........................ 379/67, 74, 80, 379/88, 89, 90, 92, 93, 102, 142, 201, 242, 243, 244, 245, 246; 381/41, 42, 43; 395/2.79

[56] References Cited

U.S. PATENT DOCUMENTS

| | | | |
|---|---|---|---|
| 5,193,110 | 3/1993 | Jones et al. | 379/94 |
| 5,199,062 | 3/1993 | Von Meister et al. | 379/67 |
| 5,345,501 | 9/1994 | Shelton | 379/89 |
| 5,351,276 | 9/1994 | Doll, Jr. et al. | 379/67 |
| 5,359,645 | 10/1994 | Katz | 379/93 |
| 5,479,491 | 12/1995 | Herrero Garcia et al. | 379/88 |
| 5,528,672 | 6/1996 | Wert | 379/96 |

FOREIGN PATENT DOCUMENTS 3225562  1/1984  Germany.

OTHER PUBLICATIONS

K. K. Knapp, "Diener AM Telefon" 21/1984, Kommunikationstechnik, pp. 55–58.

Primary Examiner—Krista M. Zele
Assistant Examiner—Scott L. Weaver
Attorney, Agent, or Firm—Kenyon & Kenyon

[57] ABSTRACT

A voice-recognition unit is interfaced with the connection to an ordering server provided within a switching exchange. This voice-recognition unit recognizes individual key words from vocal utterances supplied by a user via a calling line unit and activates a dialog control device located in the ordering server. As a result, the dialog control device activates a call number memory, a call number corresponding to the recognized key word being read out, which serves to establish a connection to an exchange receiving this order. The voice-recognition unit interfaced with this connection can likewise recognize key words from the answer coming from the calling exchange, whereupon criteria are formed, indicating whether the order had been properly received or not. Different types of orders can be placed quickly using simple dialing and operator control procedures and through vocal utterances. The ordering server performs all functions required for the communication with an exchange receiving the order substantially automatically.

12 Claims, 1 Drawing Sheet

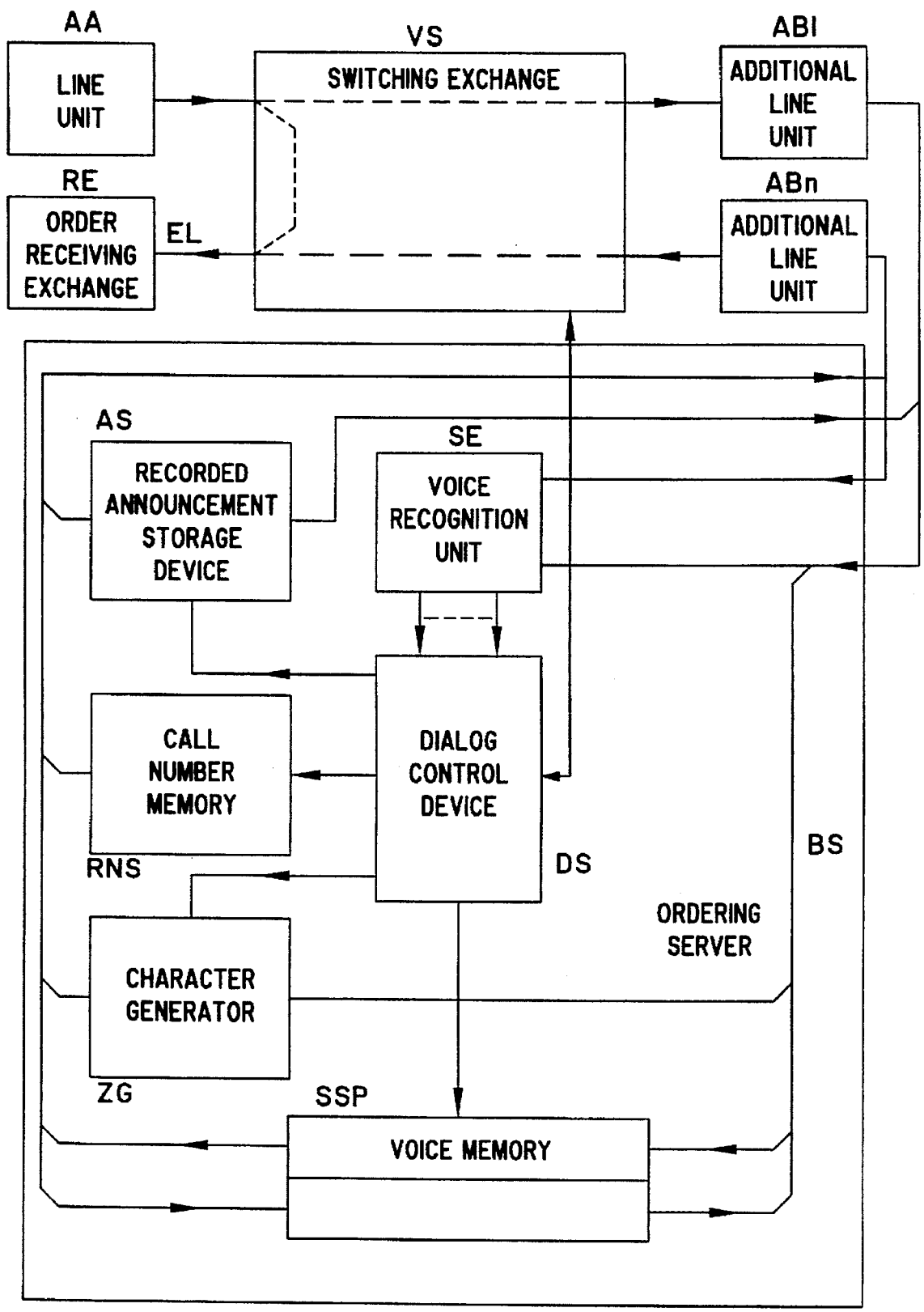

METHOD FOR OPERATING AN AUTOMATIC ORDERING SYSTEM IN COMMUNICATION SWITCHING EXCHANGES

FIELD OF THE INVENTION

The present invention relates to a method for operating an automatic ordering system in communication switching exchanges.

BACKGROUND INFORMATION

German Patent No. 32 25 562 describes a method for automatically taking orders using a telecommunications system, in particular a telephone switching system. This method is based on a customer dialing a dedicated call number corresponding to the order to reach an exchange which automatically receives the order. The customer is then clearly identified with this dedicated call number, so that the type of order and the customer's address can be automatically registered. When this is done, the customer receives an automatic spoken confirmation of his order.

This method necessitates providing a dedicated multi-digit call number for each type of order. The user must, therefore, know several call numbers when he intends to place different kinds of orders with different exchanges. Thus, the placing of an order is controlled exclusively by the dialing of a multi-digit call number, so that there is the risk of errors, and the time needed to complete the operation is relatively long.

An article about an intelligent telephone answering set entitled *Diener am Telefon* (Valet on the Phone) is published in Funkschau (Radio Show) 21/1984 starting on page 55. The device it describes is used exclusively to automatically answer incoming phone calls. Functions that go beyond the operation of a normal telephone answering set are described, it being indicated how an automatic man-machine dialog can take place. To be able to put together such a dialog with appropriate questions and responses, the so-called machine attempts to identify the caller by his name, as is described at the end of page 56 and at the beginning of page 57. A voice-recognition system is used for this purpose, as is explained in greater detail in the middle column of page 57. However, this voice-recognition system is used exclusively to control a dialog in the case of incoming telephone calls.

In addition, this article describes that outgoing calls can also be handled via this "valet on the phone". For this purpose, a touch-sensitive screen is provided, with which single digits or even complete call numbers can be activated by touch to establish an outgoing connection. This article does not discuss using a voice-recognition system to establish outgoing connections as well.

SUMMARY OF THE INVENTION

An object of the present invention is to provide a method which will enable an ordering (teleshopping) system to be operated in communication switching exchanges, in particular telephone private-branch exchanges (PBXes or extensions), where simple dialing and service operations (interactive operator control operations) will take place. The aim is to facilitate service for the user and provide him with time savings.

To achieve this objective, a combination of features is provided. To place various orders, one need only dial one single short call number or single digit, and use vocal utterances (statements) to establish a connection to the exchange receiving an order, and to specify the order. The time needed to establish a connection to the ordering server is minimal, and the user does not have to wait for the exchange taking the order to respond.

BRIEF DESCRIPTION OF THE DRAWINGS

The FIGURE shows a block diagram for illustrating the method according to the present invention.

DETAILED DESCRIPTION

The FIGURE schematically depicts a switching exchange VS, to which are connected a plurality of line units AA and external lines EL. This switching exchange VS is linked via a plurality of additional line units AB1 through ABn to an ordering server BS. The ordering server BS shown here as a separate device can, however, also be integrated into the switching exchange VS, so that the special line units AB1 through ABn do not have to be present.

The ordering server BS essentially includes a dialog control device DS with a series-connected voice-recognition unit SE, a recorded voice announcement storage device AS, a call number memory RNS, and a voice memory SSP. In addition, a character generator ZG can also be provided when there is a need to produce and transmit alphanumerically displayable information for data terminals equipped with display devices. The functions of the components of the ordering server BS are clarified in the following based on descriptions of practical examples.

Let's assume that a taxi is being ordered from a calling line unit AA. To do this, one must dial an easily remembered call number or even only one signal digit to reach the ordering server BS via a line unit, for example AB1, assigned to it. It is also possible for a plurality of line units AB1 through ABn to be provided, which can be operated as a collective line (PBX), so that several orders can be processed simultaneously, provided that the ordering server has suitable memory and computing capacity. When a connection has been established between the calling line unit AA and the line unit AB1 of the ordering server within the switching exchange VS, a recorded announcement stored in the recorded announcement storage device AS prompts the caller to place his order. In this case, a type of operator prompting can be provided, requesting that the user carefully include the words that clearly define his order in the voice entry. Thus, when a taxi is requested, the word taxi must absolutely be included in the text supplied by the user.

The vocal utterances supplied by the calling line unit AA are transmitted across the switching exchange VS to the ordering server BS and received there by the voice-recognition unit SE. The voice-recognition unit SE functions in the manner of a speaker-independent voice-recognition system such that various stimulus words, such as taxi, room, date, space and others can be recognized as being especially relevant.

When one of these stimulus words, such as taxi, is recognized by the voice-recognition unit SE, this is communicated to the dialog control device DS, causing it to activate the call number memory RNS using a preset command. Several call numbers assigned to each of the stimulus words are stored in the call number memory RNS. These can be both internal call numbers, for example private branch call numbers for the switching exchange VS itself or call numbers which can be used to establish a connection via an external line EL. With the help of the call number memory RNS, the dialog control device DS then establishes a connection to an exchange receiving the order, a line unit, e.g.

ABn, assigned to the ordering server BS being used. In this case, the dialog control device DS monitors the current status of the established connection. It can, thus, be established whether the line of an exchange receiving the order that is reached is free or busy, and when a message will follow from there.

After the order-receiving exchange RE responds, the recorded-announcement storage device AS is activated by the dialog control device DS to relay a prepared recorded announcement stored there. It includes the name and the address of the firm placing the order. Following the relaying of the recorded announcement, additional information pertaining to the order that had been relayed beforehand from the calling line unit is likewise communicated to the order-receiving exchange RE. The information about what time the requested taxi must be at which location can be communicated in this case. Another recorded announcement follows prompting the operator (dispatcher) at the exchange receiving the order to confirm the entry and inform whether or not the order being taken can be filled. This recorded announcement includes the instruction that certain key words must be contained in the text to be relayed vocally.

The voice-recognition unit SE, which is interfaced with the outgoing connection to the exchange receiving an order, now recognizes the key words contained in a response and then determines whether or not an order can be filled. The voice-recognition unit SE communicates appropriate messages to the dialog control device DS. The user at the calling line unit AA receives a corresponding communication from the recorded announcement storage device AS, so that it can be clearly discerned whether the order was successful or not. In the case that the connection had been released (disconnected) beforehand by the calling line unit AA, then a call is put through once more, a connection being established between the calling line unit AA and the ordering server BS via the assigned line unit AB1.

For the case that the voice-recognition unit SE cannot recognize any clearly interpretable key words from the answer communicated by an exchange receiving the order, then the user at the calling line unit AA is informed of this. In this case, a direct connection is automatically established, in the example between the calling line unit AA and the external line EL. In the case of such a connection, any existing inconsistencies can be cleared up in the direct dialog.

In a method of this type, one can additionally incorporate the character generator ZG that is also located in the ordering server BS. This happens when the switching exchange VS recognizes that a data terminal connected to the calling line unit AA has a display device or that a character transmission via the external line EL is possible and that a data terminal controlled by it has a display device. The information produced in the character generator ZG is transmitted to the calling line unit AA and serves to inform the user about the successful outcome of his order. A character transmission of this type is made visible in the display device of the data terminal in question and can also take place in addition to a recorded voice announcement. Alphanumerically displayable characters can likewise be transmitted via the connection established to an exchange receiving the order, by which means the data concerning the order can be communicated in abbreviated form, e.g. taxi on (date) at (time) to (location specifics). This character transmission can also take place in addition to a recorded announcement text.

The voice memory SSP located in the ordering server BS is divided into two areas that are defined by direction, in which the vocal communications received from the calling line unit AA or from the exchange taking an order are temporarily stored. For the case that there are unclear details (items) when an order is being received, the voice memory SSP can be activated via a special signal by the exchange taking an order and the corresponding content, i.e., the vocal communication being received by the calling line unit AA can be tapped (listened to). This signal can either be transmitted via an existing signaling channel or in the form of a voice-frequency dialing signal via the voice-communication path. With a signal of this type, the dialog control device DS can also be induced by the calling line unit AA to activate the voice memory SSP in the case that there are any unclear details when an order is being acknowledged. In this case, the user who placed the order can listen to the answer communicated vocally by an exchange accepting an order. The voice memory SSP thus serves to provide additional mutual clarification of criteria pertaining to an order. When the pertinent information is no longer needed, the areas within the voice memory SSP are each released to permit overwriting.

A voice encoding device (not shown) provided for each direction is connected in series to the voice memory SSP. This voice encoding device can be designed to temporarily accommodate adequate vocal communications with a relatively small storage capacity to be provided. The voice memory SSP can also be activated by a vocal command given by the calling exchange AA or by the exchange receiving an order. This command, e.g., the word "listen" or "tap", is then received and recognized by the voice-recognition unit, the command for activating the voice memory SSP being given by the dialog control device DS.

In place of a voice-recognition unit SE, one can provide a dialed-digit (selection-digit) recognition unit, e.g. a dual tone multi-frequency receiver. From the calling line unit AA, the type of order can then be controlled by a pushbutton set and by the voice-frequency dialing information it generates. A code or code digit is then to be provided for each type of order and is to be subsequently dialed following the establishment of a connection to the ordering server BS.

In addition, the dialog control device can initiate an identification of the calling line unit AA, which makes it possible to supplement recorded announcement texts stored in the recorded announcement storage device AS. Thus, a more accurate indication of the ordering party (customer) can be relayed to an exchange accepting the order. It can be a question, e.g., of the communication of the call number of the ordering party, which would have to be dialed in the case of a call back to clear up any unclear details.

As already mentioned at the outset, different types of orders can be processed by the ordering server BS. When, for example, the word "taxi" is recognized by the voice-recognition unit SE within the text spoken by the ordering party, the call number memory RNS is activated by the dialog control device DS to output the call number of the local taxi exchange. When the word "room" is recognized, the call number of a hotel is read out accordingly from the call number memory RNS. When a room is reserved, a connection can also be made to the name of a city, so that the call number of a hotel together with the corresponding code for the local telephone exchange area is selected in the call number memory RNS. Travel tickets and admission tickets could be ordered in a similar fashion.

The examples described so far assumed that one connection was established via one external line EL each. However, services, which can be performed within the switching exchange VS, can also be easily handled via the ordering server. These can be, e.g., room reservations or dates for a conference. Since the exchange receiving an order of this type is then located, so to speak, in-house, the call number memory RNS at the exchange in question contains the call number for an internal connection. Thus, for example, when the word "room" or "date" is recognized by the voice-recognition unit SE, an internal connection to an extension is established. In this case, all functions are, of course, effective, as described above for the example of an external connection.

The ordering server BS offers the advantage to a user of not having to wait (right away) for the response to an order. Even when the exchange that receives an order is busy, the user can give the order to the ordering server BS, there being automatic redialing carried out in this case. Alternative call numbers can also be provided in the call number memory RNS, which are then transmitted when the connection to an order-receiving exchange RE did not materialize with the call number previously transmitted. Thus, for example, instead of the taxi exchange, a car rental firm could be called up, or in the case of a room reservation, another hotel could be dialed. The user can establish a connection to the ordering server BS at any time to find out about the status of his order. It is also possible for information that is no longer needed for an order to be erased in the voice memory SSP. Moreover, it is contemplated that the ordering server BS not only be used for services, but also for ordering goods.

What is claimed is:

1. A method of operating an ordering system, comprising the steps of:

recognizing at least one first vocal key word from an order provided by a user via one of at least one calling line unit, the at least one first vocal key word being recognized using an ordering server;

retrieving a call number corresponding to the recognized first vocal key word from a call number memory, the call number memory storing the call number;

attempting to establish a connection with an order-receiving exchange as a function of the call number;

retrieving a first recorded announcement corresponding to the recognized first vocal key word from a recorded announcement storage device, the recorded-announcement storage device storing the first recorded announcement;

transmitting the retrieved first recorded announcement to the order-receiving exchange;

requesting an answer from the order-receiving exchange;

recognizing at least one second key word from the answer provided from the order-receiving exchange;

determining whether the order has been confirmed by the order-receiving exchange as a function of the recognized second key word;

retrieving a second recorded announcement from the recorded-announcement storage device as a function of the confirmation determination; and transmitting the second recorded announcement to the user via the at least one calling line unit.

2. The method according to claim 1, further comprising the steps of:

temporarily recording, in a voice memory, information, including date and time information, provided from the at least one calling line unit; and integrating the information into the first recorded announcement.

3. The method according to claim 1, further comprising the-step of providing display information over a signaling channel using a character generator and a digital control device, the signaling channel being associated with the at least one calling line unit.

4. The method according to claim 3, wherein the display information includes digital information generated in response to the answer and transmitted to the at least one calling line unit.

5. The method according to claim 1, further comprising the steps of:

temporarily recording, in a voice memory, the answer; and relaying the answer to the at least one calling line unit if the order was not acknowledged.

6. The method according to claim 1, further comprising the step of connecting the at least one calling line unit to the order-receiving exchange when an order cannot be automatically recorded.

7. The method according to claim 1, further comprising the step of, after attempting to establish the connection with the order-receiving exchange, re-retrieving the call number from the call number memory in order to automatically redial the order-receiving exchange if the order-receiving exchange is busy.

8. The method according to claim 1, wherein the order and the answer are recognized in a voice-recognition device of the ordering server.

9. The method according to claim 1, further comprising the step of allowing the order-receiving exchange to listen to information contained in a voice memory by at least one of entering a voice command and depressing a pushbutton.

10. The method according to claim 1, further comprising the step of identifying the at least one calling line unit.

11. The method according to claim 1, wherein the order is provided to the ordering server, the ordering server being coupled to a switching exchange via at least one of a plurality of additional line units.

12. The method according to claim 1, wherein the order is provided to the ordering server integrated in a switching exchange.

* * * * *

UNITED STATES PATENT AND TRADEMARK OFFICE
CERTIFICATE OF CORRECTION

PATENT NO. : 5,661,784
DATED : August 26, 1997
INVENTOR(S) : Joachim Zinke It is certified that error appears in the above-identified patent and that said Letters Patent is hereby corrected as shown below:

Column 4, line 35, change ".....multi-frequency" to --.....multi-frequency(DTMF)--.

Signed and Sealed this

Fifteenth Day of December, 1998

*Attest:*

BRUCE LEHMAN

*Attesting Officer*     *Commissioner of Patents and Trademarks*